(12) United States Patent
de Castillo

(10) Patent No.: US 8,713,540 B2
(45) Date of Patent: Apr. 29, 2014

(54) GENERATING AND MODIFYING TEXTUAL CODE INTERFACES FROM GRAPHICAL PROGRAMS

(75) Inventor: Alejandro de Castillo, Austin, TX (US)

(73) Assignee: National Instruments Corporation, Austin, TX (US)

( * ) Notice: Subject to any disclaimer, the term of this patent is extended or adjusted under 35 U.S.C. 154(b) by 596 days.

(21) Appl. No.: 12/846,284

(22) Filed: Jul. 29, 2010

(65) Prior Publication Data

US 2012/0030655 A1 Feb. 2, 2012

(51) Int. Cl.
*G06F 9/44* (2006.01)

(52) U.S. Cl.
USPC ............ 717/136; 717/105; 717/109; 717/113

(58) Field of Classification Search
None
See application file for complete search history.

(56) References Cited

U.S. PATENT DOCUMENTS

| | | | |
|---|---|---|---|
| 4,914,568 A | 4/1990 | Kodosky et al. | |
| 5,481,741 A | 1/1996 | McKaskle et al. | |
| 5,689,711 A * | 11/1997 | Bardasz et al. | 717/105 |
| 6,173,438 B1 | 1/2001 | Kodosky et al. | |
| 6,219,628 B1 | 4/2001 | Kodosky et al. | |
| 6,282,699 B1 * | 8/2001 | Zhang et al. | 717/109 |
| 6,484,276 B1 | 11/2002 | Singh et al. | |
| 6,874,148 B1 * | 3/2005 | Richardson et al. | 719/328 |
| 7,178,112 B1 * | 2/2007 | Ciolfi et al. | 703/2 |
| 7,210,117 B2 | 4/2007 | Kudukoli et al. | |
| 7,689,970 B1 * | 3/2010 | Englehart et al. | 717/109 |
| 7,757,218 B2 | 7/2010 | Aroya | |
| 7,802,230 B1 * | 9/2010 | Mendicino et al. | 717/113 |
| 7,831,960 B2 | 11/2010 | Vazquez et al. | |
| 8,146,053 B2 * | 3/2012 | Morrow et al. | 717/109 |
| 2003/0101334 A1 * | 5/2003 | Desoli | 712/227 |
| 2005/0086635 A1 * | 4/2005 | Parikh et al. | 717/103 |
| 2005/0155014 A1 * | 7/2005 | Andrade et al. | 717/105 |
| 2005/0283758 A1 * | 12/2005 | Cobcroft et al. | 717/113 |

(Continued)

OTHER PUBLICATIONS

Anonymous, "C Interface Generator for LabVIEW Project-Style Instrument Drivers Readme (Windows Only)", National Instruments Corporation [online], 2006 [retrieved Dec. 7, 2013], Retrieved from Internet: <ftp://ftp.ni.com/support/instr_drivers/labview/windows/current/tools/conversion/readmelvtoc_1.0.html>, pp. 1-6.*
U.S. Appl. No. 12/486,976, entitled "Compiling a Graphical Program Having a Textual Language Program Portion for a Real Time Target", by Duncan G. Hudson III and Rishi H. Gosalia, filed on Jun. 18, 2009; 35 pages.

(Continued)

*Primary Examiner* — Don Wong
*Assistant Examiner* — Todd Aguilera
(74) *Attorney, Agent, or Firm* — Meyertons Hood Kivlin Kowert & Goetzel, P.C.; Jeffrey C. Hood; Mark S. Williams

(57) ABSTRACT

A graphical program is analyzed, where the graphical program includes an I/O interface including one or more ordered parameters for providing input to or receiving output from the graphical program. A function is generated in a textual programming language based on the analyzing, where the function implements the functionality of the graphical program, and includes a textual function I/O interface with the one or more ordered parameters of the I/O interface of the graphical program. User input is received specifying a modified textual function I/O interface that differs from the textual function I/O interface. A wrapper for the function is generated with the modified textual function I/O interface, where the wrapper includes the function, and where during execution the wrapper receives or outputs values in accordance with the modified textual function I/O interface, and provides values to or receives values from the function via the textual function I/O interface.

20 Claims, 20 Drawing Sheets

(56) References Cited

U.S. PATENT DOCUMENTS

| | | |
|---|---|---|
| 2006/0004768 A1* | 1/2006 | Betts et al. .................... 707/10 |
| 2006/0064670 A1* | 3/2006 | Linebarger et al. ........... 717/106 |
| 2008/0022259 A1 | 1/2008 | MacKlem et al. |
| 2008/0082961 A1* | 4/2008 | Adams et al. ................. 717/109 |
| 2008/0109785 A1* | 5/2008 | Bailey ........................... 717/109 |
| 2009/0049424 A1* | 2/2009 | Kumar et al. ................. 717/109 |
| 2010/0306753 A1* | 12/2010 | Yi et al. ........................ 717/149 |
| 2012/0023160 A1* | 1/2012 | Marmor ........................ 709/203 |

OTHER PUBLICATIONS

U.S. Appl. No. 12/487,003, entitled "Providing Target Specific Information for Textual Code at Edit Time", by Duncan G. Hudson III and Rishi H. Gosalia, filed on Jun. 18, 2009; 36 pages.

"Can LabVIEW C?—Example 3: Using the Right Tools with LabVIEW"; National Instruments Corporation; Jul. 7, 2008; 5 pages. Obtained from Internet: <http://zone.ni.com/devzone/cda/tut/p/id/2719>.

\* cited by examiner computer system

```
#ifndef _test_VILib_h
define _test_VILib_h include "LVDefs_plat.h"

ifndef CGEN_LIBFUNC_PREFIX
#define CGEN_LIBFUNC_PREFIX
#endif
#ifndef CGEN_LIBFUNC_CALL
#define CGEN_LIBFUNC_CALL
endif ifdef __cplusplus
extern "C" {
endif typedef struct {
        Boolean myBool;
        float64 myScalar;
        } TD1;

CGEN_LIBFUNC_PREFIX void CGEN_LIBFUNC_CALL test_VI(Boolean array_in[],     // Input
        Char string_in[],           // Input
        float64 scalar_In,          // Input
        TD1 *cluster_Out,           // Output
        int32 len);                 // Length for array_in ifdef __cplusplus
} // extern "C"
endif endif /* _test_VILib_h */
```

*FIG. 7C*

```
void test_VI(Boolean array_in[],
Char string_in[],
float64 scalar_In,
TD1 *cluster_Out,
int32 len)
{
    int32 i;
    LVCGenRTInit();

/* Init globals */
    for (i=0;i<sizeof(globTable)/sizeof(InitFPTermsFunc);i++) {
            (*(globTable[i]))(NULL, false);
    }
    /* Init VI Constants */
    for (i=0;i<sizeof(globConstInitTable)/sizeof(VoidFn);i++) {
            (*(globConstInitTable[i]))();
    }
    test_VI_AddSubVIInstanceData();
    test_VI_InitVIConstantList();

test_VI_in_2_array_in_223416656 = (PDAArrPtr)PDAArrNewFromCArray( array_in, 0xB0000 | ArrayDataType, len );
    test_VI_in_1_string_in_223469920 = PDAStrNewFromBuf( string_in, StrLen(string_in) );

test_VI_in_0_scalar_In_223417712 = scalar_In;

/* Call top level VI main function */
    test_VI_Run();
    *((cl_A0000*)cluster_Out) = *test_VI_out_0_cluster_Out_223415792;
    /* Cleanup VI Constants */
    for (i=0;i<sizeof(globConstCleanupTable)/sizeof(VoidFn);i++) {
            (*(globConstCleanupTable[i]))();
    }

/* Cleanup globals */
    for (i=0;i<sizeof(globCleanupTable)/sizeof(VoidFn);i++) {
            (*(globCleanupTable[i]))(false);

}
    for (i=0;i<sizeof(IsrCleanupTable)/sizeof(VoidFn);i++) {
            (*(IsrCleanupTable[i]))();
    }

LVCGenRTEnd();
    return;
}
```

*FIG. 7D*

```
#ifndef _test_VILib_h
define _test_VILib_h include "LVDefs_plat.h"

ifndef CGEN_LIBFUNC_PREFIX
#define CGEN_LIBFUNC_PREFIX
#endif
#ifndef CGEN_LIBFUNC_CALL
#define CGEN_LIBFUNC_CALL
endif ifdef __cplusplus
extern "C" {
endif typedef struct {
        uInt32 res1;
        int16 res2;
        uInt8 res3;
        uInt8 res4;
        uInt32 numDims;
        ArrDimSize dimSizes[1];
        Boolean elemArr[1];
        } LVArr1;
typedef LVArr1 **LVArr1Hdl;

typedef struct {
        Boolean myBool;
        float64 myScalar;
        } TD2;

CGEN_LIBFUNC_PREFIX void CGEN_LIBFUNC_CALL test_VI(LVArr1Hdl array_in,      // Input
            Char string_in[],                   // Input
            float64 scalar_In,                  // Input
            TD2 *cluster_Out);                  // Output ifdef __cplusplus
} // extern "C"
endif endif /* _test_VILib_h */
```

FIG. 8B

```
void test_VI(LVArr1Hdl array_in,
Char string_in[],
float64 scalar_In,
TD2 *cluster_Out)
{
        int32 i;
        LVCGenRTInit();

/* Init globals */
        for (i=0;i<sizeof(globTable)/sizeof(InitFPTermsFunc);i++) {
                (*(globTable[i]))(NULL, false);
        }

/* Init VI Constants */
        for (i=0;i<sizeof(globConstInitTable)/sizeof(VoidFn);i++) {
                (*(globConstInitTable[i]))();
        } test_VI_AddSubVIInstanceData();
        test_VI_InitVIConstantList();

test_VI_in_2_array_in_230216152 = *array_in;
        ((PDAArrPtr)test_VI_in_2_array_in_230216152)->refcnt = 1;
        ((PDAArrPtr)test_VI_in_2_array_in_230216152)->staticArray = 1;
        ((PDAArrPtr)test_VI_in_2_array_in_230216152)->GlobalVariable = 0;
        ((PDAArrPtr)test_VI_in_2_array_in_230216152)->datatype = BooleanDataType;
        NDims((PDAArrPtr)test_VI_in_2_array_in_230216152) = 1;
        test_VI_in_1_string_in_230211792 = PDAStrNewFromBuf( string_in, StrLen(string_in) );
        test_VI_in_0_scalar_In_230214904 = scalar_In;
        /* Call top level VI main function */
        test_VI_Run();
        *((cl_A0000*)cluster_Out) = *test_VI_out_0_cluster_Out_230217304;
        /* Cleanup VI Constants */
        for (i=0;i<sizeof(globConstCleanupTable)/sizeof(VoidFn);i++) {
                (*(globConstCleanupTable[i]))();
        }

/* Cleanup globals */
        for (i=0;i<sizeof(globCleanupTable)/sizeof(VoidFn);i++) {
                (*(globCleanupTable[i]))(false);
        }
        for (i=0;i<sizeof(IsrCleanupTable)/sizeof(VoidFn);i++) {
                (*(IsrCleanupTable[i]))();
        }

LVCGenRTEnd();
        return;
}
```

*FIG. 8C*

```
#ifndef _test_VILib_h
define _test_VILib_h include "LVDefs_plat.h"

ifndef CGEN_LIBFUNC_PREFIX
#define CGEN_LIBFUNC_PREFIX
#endif
#ifndef  CGEN_LIBFUNC_CALL
#define  CGEN_LIBFUNC_CALL
endif ifdef __cplusplus
extern "C" {
endif typedef struct {
        Boolean myBool;
        float64 myScalar;
        } TD1;

CGEN_LIBFUNC_PREFIX void CGEN_LIBFUNC_CALL myFunction(float64 scalar_In,         // Input
                TD1 *cluster_Out,                  // Output
                Char string_in[]);                 // Input ifdef __cplusplus
} // extern "C"
endif endif /* _test_VILib_h */
```

*FIG. 9B*

```
void myFunction(float64 scalar_In,
TD1 *cluster_Out,
Char string_in[])
{
        int32 i;
        LVCGenRTInit();

/* Init globals */
        for (i=0;i<sizeof(globTable)/sizeof(InitFPTermsFunc);i++) {
                (*(globTable[i]))(NULL, false);
        }

/* Init VI Constants */
        for (i=0;i<sizeof(globConstInitTable)/sizeof(VoidFn);i++) {
                (*(globConstInitTable[i]))();
        } test_VI_AddSubVIInstanceData();
        test_VI_InitVIConstantList();

test_VI_in_0_scalar_In_615038024 = scalar_In;
        test_VI_in_1_string_in_636638824 = PDAStrNewFromBuf( string_in, StrLen(string_in) );
        /* Call top level VI main function */
        test_VI_Run();
        *((cl_A0000*)cluster_Out) = *test_VI_out_0_cluster_Out_615040424;

/* Cleanup VI Constants */
        for (i=0;i<sizeof(globConstCleanupTable)/sizeof(VoidFn);i++) {
                (*(globConstCleanupTable[i]))();
        }

/* Cleanup globals */
        for (i=0;i<sizeof(globCleanupTable)/sizeof(VoidFn);i++) {
                (*(globCleanupTable[i]))(false);
        } for (i=0;i<sizeof(lsrCleanupTable)/sizeof(VoidFn);i++) {
                (*(lsrCleanupTable[i]))();
        }

LVCGenRTEnd();
        return;
}
```

*FIG. 9C*

GENERATING AND MODIFYING TEXTUAL CODE INTERFACES FROM GRAPHICAL PROGRAMS

FIELD OF THE INVENTION

The present invention relates to the field of programming, and more particularly to a system and method for generating and modifying textual code interfaces from graphical programs.

DESCRIPTION OF THE RELATED ART

Graphical programming has become a powerful tool available to programmers. Graphical programming environments such as the National Instruments LabVIEW® product have become very popular. Tools such as LabVIEW® have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing / machine vision applications, and motion control, among others.

Users may sometimes need to use graphical programs (or functions) in textual languages. Accordingly, improved methods for converting graphical programs to textual languages are desired.

SUMMARY OF THE INVENTION

Various embodiments are presented of a system and method for generating and modifying textual code interfaces from graphical programs.

A graphical program may be received or stored on a memory medium. The graphical program may include a plurality of interconnected nodes that visually indicate functionality of the graphical program, e.g., in a block diagram portion of the graphical program. The graphical program may be a data flow graphical program where the wires indicate data flow among the nodes of the graphical program. The graphical program may also include a user interface portion or a front panel. The graphical program may be executable to perform an industrial automation function, a process control function, a test and measurement function, etc.

The graphical program may include an I/O interface comprising one or more ordered parameters for providing input to or receiving output from the graphical program. The I/O interface may be included in or implemented by the user interface portion of the graphical program. For example, the user interface portion may include a graphical user interface (GUI) with one or more controls or indicators corresponding to the one or more parameters of the I/O interface of the graphical program. In one embodiment, the graphical program's I/O interface may be defined by a connector panel (e.g., which may be displayed in the user interface portion or block diagram portion of the graphical program). The graphical program may include one or more other graphical programs or may be a graphical program within another graphical program (e.g., may be a virtual instrument or subVI of another graphical program).

The graphical program may be analyzed. For example, the graphical program's functionality and parameters may be analyzed. In some embodiments, the graphical program may be selected by the user and the analysis may be based on that selection. For example, the user may select one or more graphical programs for analysis and subsequent processing as described below.

A function may be automatically generated in a textual programming language based on analyzing the graphical program. The generated function may implement the functionality of the graphical program. According to various embodiments, the textual programming language may be any textual programming language, e.g., C, C++, Java, .NET, etc. Additionally, the function may include a textual function I/O interface with the ordered parameters of the I/O interface of the graphical program. For example, the function may define an arguments list, which may define the data type of each argument, the order of the argument, the size of each argument, etc.

User input may be received that specifies a modification to the textual function I/O interface that differs from the textual function I/O interface. For example, the user may specify a change in the number of parameters, types of parameters, names of parameters, order of parameters, parameter passing mechanism, definitions of the parameters (e.g., length input for an array) e.g., via another parameter, etc. In some embodiments, the user may provide this input via a GUI, e.g., within a wizard for generating the function or textual code corresponding to the specified graphical program(s).

Note that the user input may be received before the function is automatically generated; in this case, the user may specify a desired textual function I/O interface that differs from the textual function I/O interface that is based on the I/O interface of the graphical program. For example, the user may specify a modification to the graphical program I/O interface prior to the function being automatically generated. Correspondingly, the function described above and the textual code described below may be generated subsequent to the user input specifying the desired I/O interface. Thus, the user input may be received before or after the function is automatically generated.

Accordingly, textual code may be automatically generated based on the user input. For example, in one embodiment, a wrapper may be automatically generated for the function in the textual programming language. The wrapper may have or utilize the modified textual function I/O interface specified by the user input. Accordingly, the wrapper may include the generated function. In some embodiments, generating the wrapper may include compiling the wrapper (or the wrapper may be compiled along, e.g., along with other functions, at a later point), including the function, to generate a binary file, such as an executable file or library file (e.g., a DLL).

During execution, the wrapper may receive or output values in accordance with the modified textual function I/O interface and may provide values to or receive values from the function via the textual function I/O interface. Thus, in one embodiment, the wrapper may be included in a program, and during execution of the program, the wrapper may receive a first ordered set of values in accordance with the modified textual function I/O interface. Accordingly, the function may be executed via the wrapper, including the wrapper providing I/O to/from the function via a second ordered set of one or more values in accordance with the textual function I/O interface.

Thus, generating the function in the textual programming language may generate a function prototype in accordance with the I/O interface of the graphical program and generating the wrapper for the function in the textual programming language with the modified textual function I/O interface may generate or implement a modified function prototype. In general, the wrapper may be able to convert between a first set of specified data types (e.g., those of the graphical programming language) and a second set of specified data types (e.g., those of the textual programming language). Thus, the wrapper may be configured to convert between corresponding, but different, data types, included in the textual function I/O interface and the textual function I/O interface, respectively.

In alternative embodiments, instead of generating a wrapper for the function, the textual code may be modified (e.g., including automatic generation of code for the function) in order to accommodate the modification to the textual function I/O interface specified by the user. For example, instead of utilizing the wrapper, the I/O interface (e.g., the arguments portion of the function) of the function itself may be modified.

Note that various portions of the above may be implemented by a software tool or program. For example, the analysis, generation of the function, reception of the user input and generation of code may be performed by the software tool. Additionally, the user input may be received via a graphical user interface (GUI) of the software tool.

In some embodiments, as indicated above, the method described above may be applied to a plurality of graphical programs. For example, where the plurality of graphical programs are included in a hierarchy of graphical programs (e.g., where there are a plurality of sub-graphical programs in a graphical program), the user may select one or more graphical programs for performing the method above. Thus, the analysis, generation of the function, modification, and code generation may be performed for one or more selected graphical programs.

BRIEF DESCRIPTION OF THE DRAWINGS

A better understanding of the present invention can be obtained when the following detailed description of the preferred embodiment is considered in conjunction with the following drawings, in which.

Figure 1A:
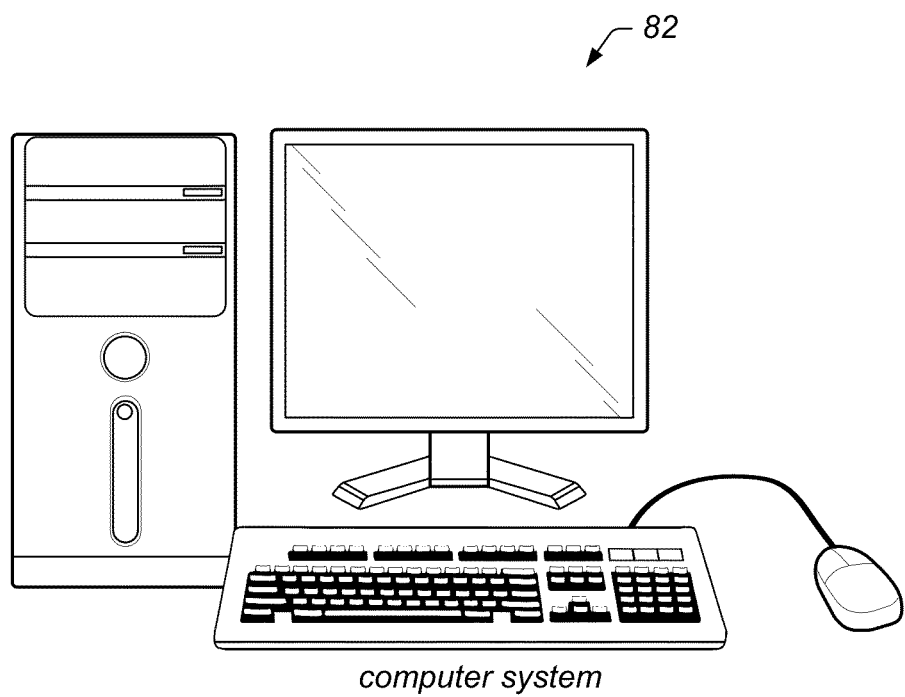
FIG. 1A illustrates a computer system configured to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW® VI is one example of a graphical data flow program. A Simulink® block diagram is another example of a graphical data flow program.

Graphical User Interface—this term is intended to have the full breadth of its ordinary meaning The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1A—Computer System

FIG. 1A illustrates a computer system 82 configured to implement various embodiments described herein. As shown in FIG. 1A, the computer system 82 may include a display device configured to display a graphical program as the graphical program is created and/or executed. The display device may also be configured to display a graphical user interface or front panel of the graphical program during execution of the graphical program. The graphical user interface may comprise any type of graphical user interface, e.g., depending on the computing platform. Additionally, as described below, the computer system 82 may be configured to execute a tool to generate textual code with customized interfaces for at least a portion of the graphical program.

The computer system 82 may include at least one memory medium on which one or more computer programs or software components according to one embodiment of the present invention may be stored. For example, the memory medium may store one or more programs which are executable to perform the methods described herein. Additionally, the memory medium may store a graphical programming development environment application used to create and/or execute graphical programs. The memory medium may also store operating system software, as well as other software for operation of the computer system. Various embodiments further include receiving or storing instructions and/or data implemented in accordance with the foregoing description upon a carrier medium.

Figure 1B:
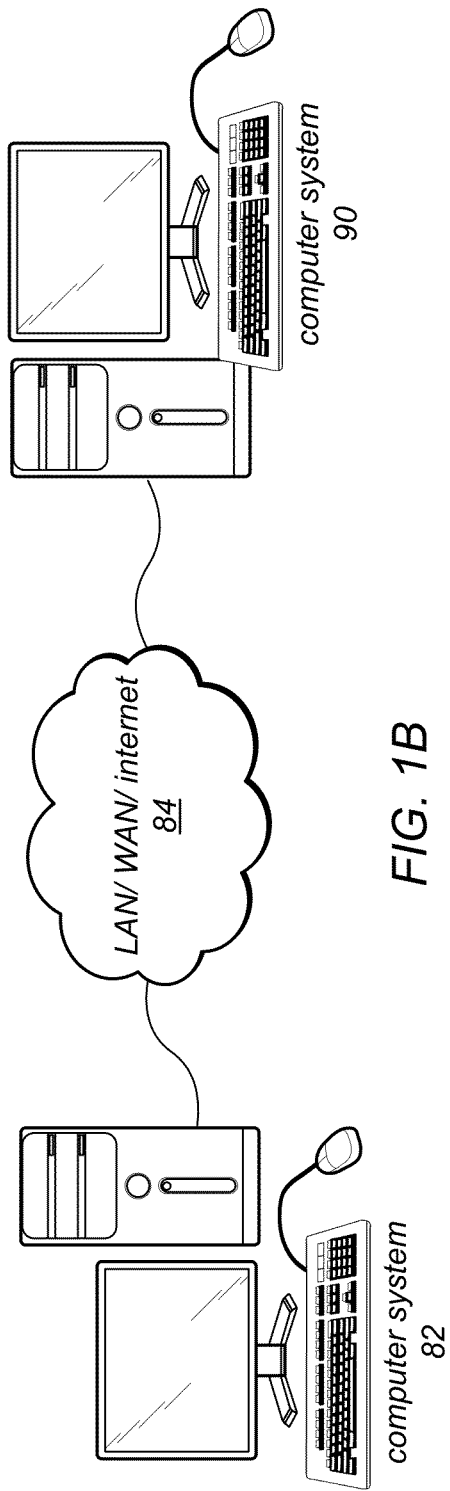
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer system 90 may generate textual code for graphical programs in response to user input to computer system 82 (e.g., corresponding to a graphical program developed or stored on computer system 82).

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
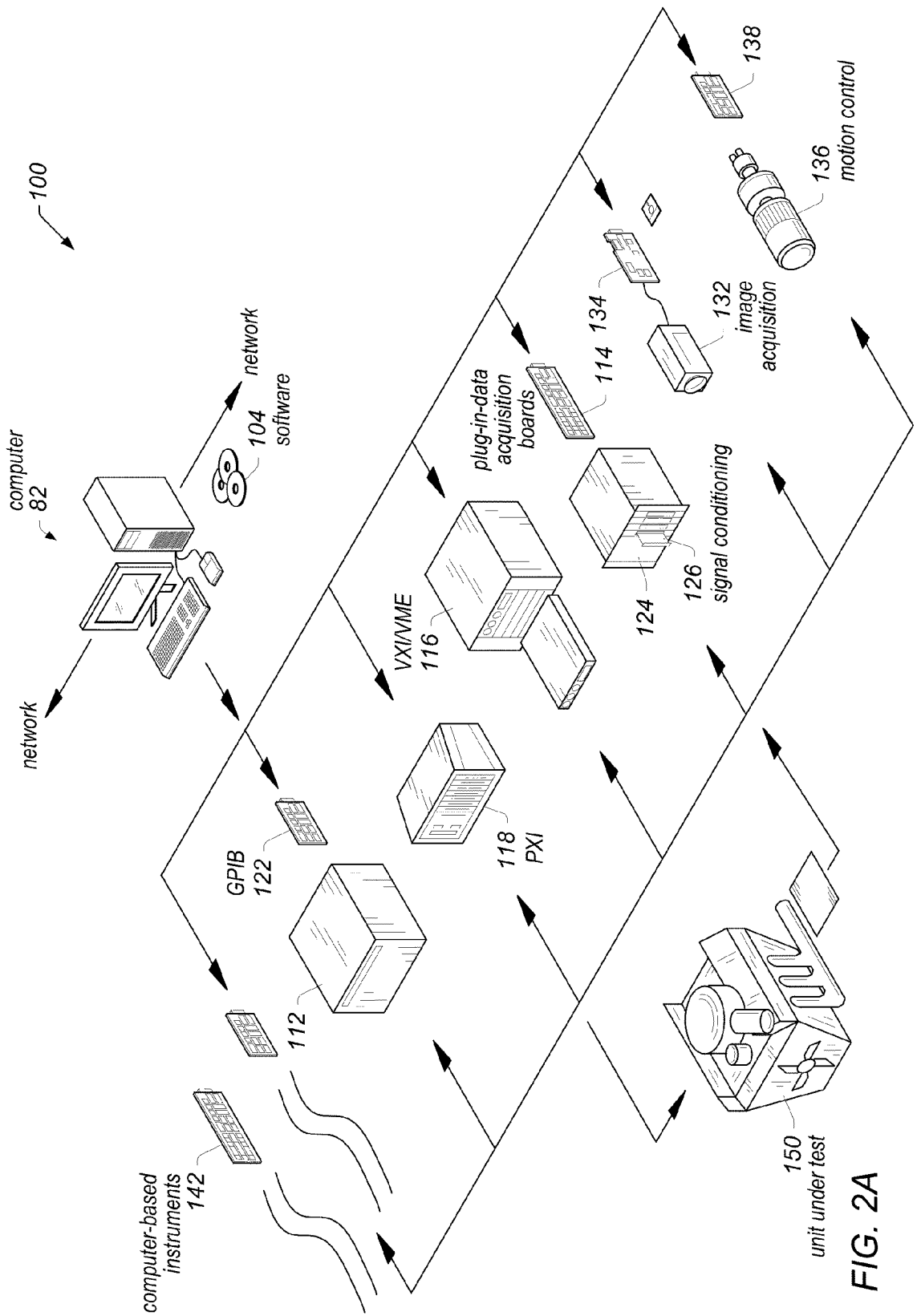
FIG. 2A illustrates an instrumentation control system according to one embodiment of the invention.

FIG. 2A illustrates an exemplary instrumentation control system 100 which may be used with graphical programs or textual programs of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB (General Purpose Interface Bus) instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
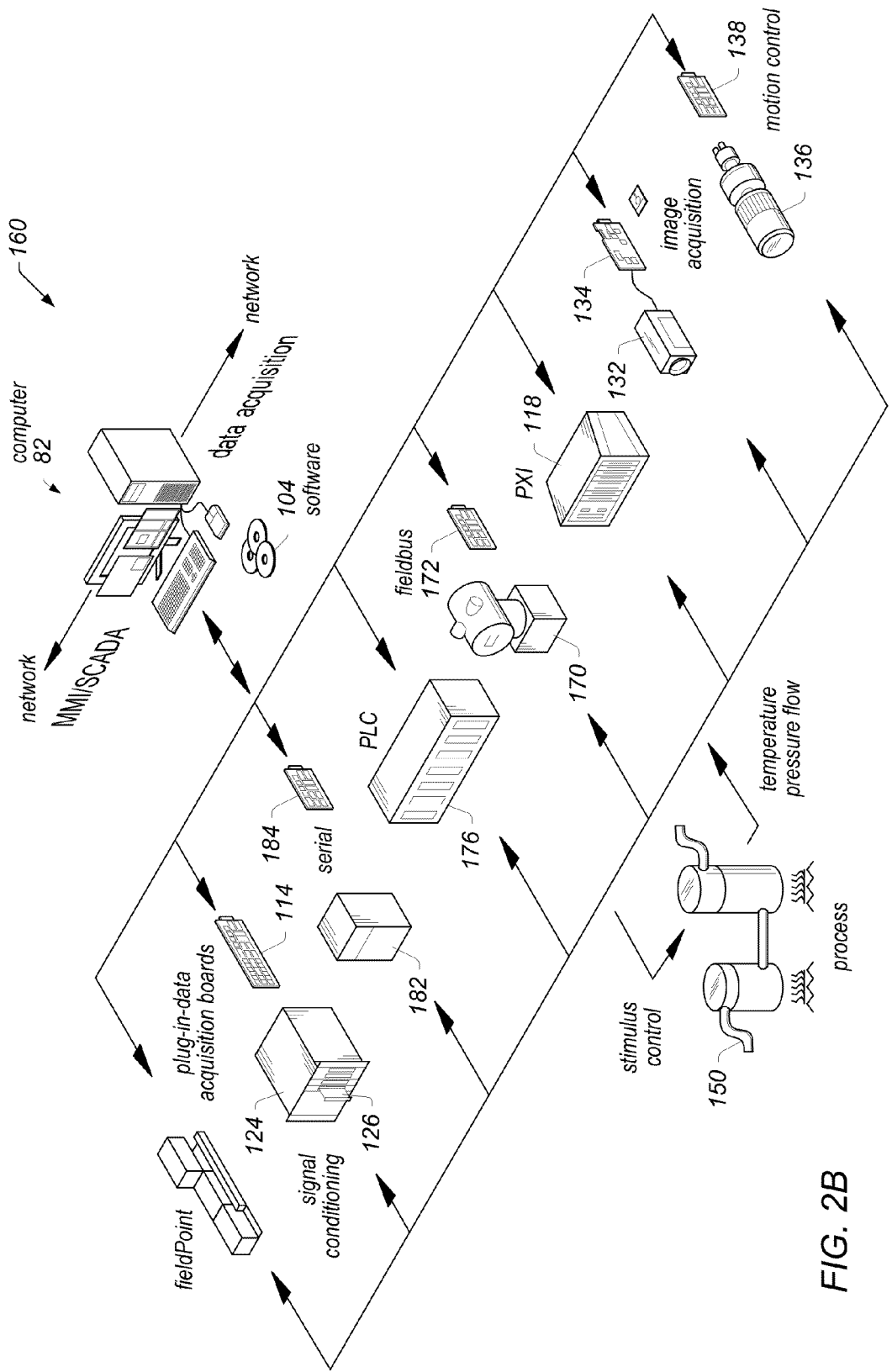
FIG. 2B illustrates an industrial automation system according to one embodiment of the invention.

FIG. 2B illustrates an exemplary industrial automation system 160 which may be used with graphical programs or textual programs of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

In the embodiments of FIGS. 2A and 2B above, one or more of the various devices may couple to each other over a network, such as the Internet. In one embodiment, the user operates to select a target device from a plurality of possible target devices for programming or configuration using a graphical program. Thus the user may create a graphical program (or textual program from the graphical program) on a computer and use (execute) the program on that computer or deploy the program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 3:
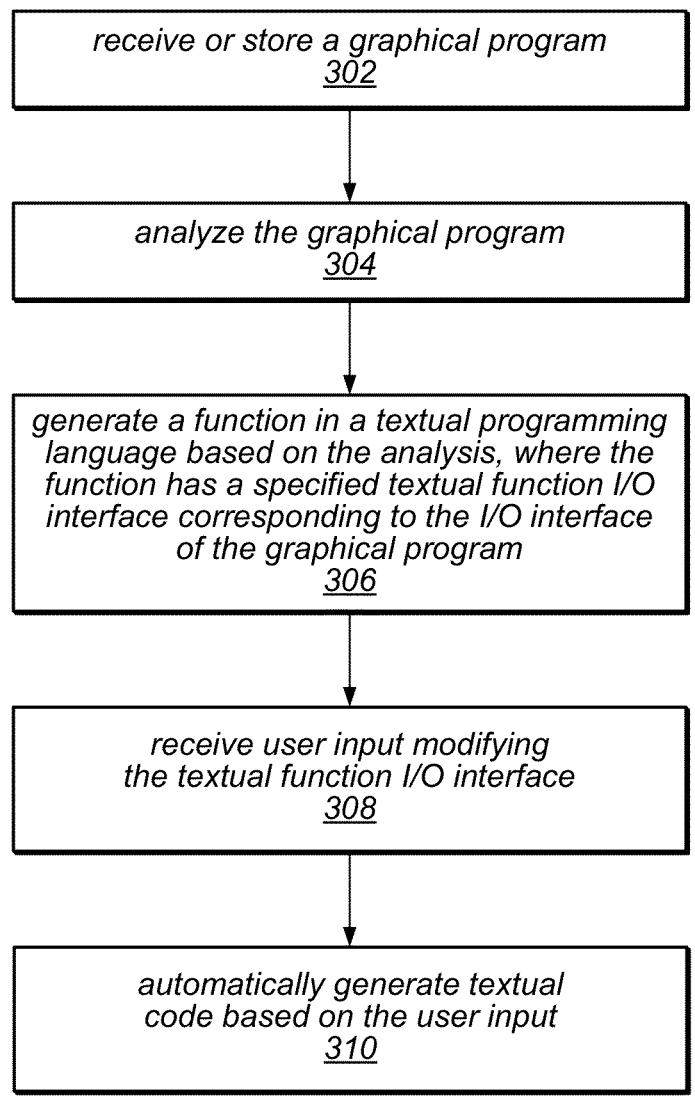
FIG. 3 is a flowchart diagram illustrating one embodiment of a method for generating and modifying textual code interfaces from graphical programs.

FIG. 3—Generating and Modifying Textual Code Interfaces from a Graphical Program FIG. 3 illustrates a method for generating and modifying textual code interfaces from a graphical program. The method shown in FIG. 3 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 302 a graphical program may be created or stored on the computer system 82 (or on a different computer system). The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created in 302 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

The graphical program may include an I/O interface comprising one or more ordered parameters for providing input to or receiving output from the graphical program. The I/O interface may be included in or implemented by the user interface portion of the graphical program. For example, the user interface portion may include a graphical user interface (GUI) with one or more controls or indicators corresponding to the one or more parameters of the I/O interface of the graphical program. In one embodiment, the graphical program's I/O interface may be defined by a connector panel (e.g., which may be displayed in the user interface portion or block diagram portion of the graphical program). The graphical program may include one or more other graphical programs or may be a graphical program within another graphical program (e.g., may be a virtual instrument or subVI of another graphical program).

In 304, the graphical program may be analyzed. For example, the graphical program's functionality and parameters may be analyzed. In some embodiments, the graphical program may be selected by the user and the analysis may be based on that selection. For example, the user may select one or more graphical programs for analysis and subsequent processing as described below.

In 306, a function may be automatically generated in a textual programming language based on analyzing the graphical program. The generated function may implement the functionality of the graphical program. According to various embodiments, the textual programming language may be any textual programming language, e.g., C, C++, Java, .NET, etc. Additionally, the function may include a textual function I/O interface with the ordered parameters of the I/O interface of the graphical program. For example, the function may define an arguments list, which may define the data type of each argument, the order of the argument, the size of each argument, etc.

In 308, user input may be received that specifies a modification to the textual function I/O interface that differs from the textual function I/O interface. For example, the user may specify a change in the number of parameters, types of parameters, names of parameters, order of parameters, parameter passing mechanism, etc. In some embodiments, the user may provide this input via a GUI, e.g., within a wizard for generating the function or textual code corresponding to the specified graphical program(s).

Note that the user input may be received before the function is automatically generated; in this case, the user may specify a desired textual function I/O interface that differs from the textual function I/O interface that is based on the I/O interface of the graphical program. For example, the user may specify a modification to the graphical program I/O interface prior to the function being automatically generated. Correspondingly, the function described above and the textual code described below may be generated subsequent to the user input specifying the desired I/O interface. Thus, the user input may be received before or after the function is automatically generated.

Accordingly, in 310, textual code may be automatically generated based on the user input. For example, in one embodiment, a wrapper may be automatically generated for the function in the textual programming language. The wrapper may have or utilize the modified textual function I/O interface specified by the user input. Accordingly, the wrapper may include the generated function. In some embodiments, generating the wrapper may include compiling the wrapper (or the wrapper may be compiled along, e.g., along with other functions, at a later point), including the function, to generate a binary file, such as an executable file or library file (e.g., a DLL).

During execution, the wrapper may receive or output values in accordance with the modified textual function I/O interface and may provide values to or receive values from the function via the textual function I/O interface. Thus, in one embodiment, the wrapper may be included in a program, and during execution of the program, the wrapper may receive a first ordered set of values in accordance with the modified textual function I/O interface. Accordingly, the function may be executed via the wrapper, including the wrapper providing I/O to/from the function via a second ordered set of one or more values in accordance with the textual function I/O interface.

Thus, generating the function in the textual programming language may generate a function prototype in accordance with the I/O interface of the graphical program and generating the wrapper for the function in the textual programming language with the modified textual function I/O interface may generate or implement a modified function prototype. In general, the wrapper may be able to convert between a first set of specified data types (e.g., those of the graphical programming language) and a second set of specified data types (e.g., those of the textual programming language). Thus, the wrapper may be configured to convert between corresponding, but different, data types, included in the textual function I/O interface and the textual function I/O interface, respectively.

In alternative embodiments, instead of generating a wrapper for the function, the textual code may be modified (e.g., including automatic generation of code for the function) in order to accommodate the modification to the textual function I/O interface specified by the user. For example, instead of utilizing the wrapper, the I/O interface (e.g., the arguments portion of the function) of the function itself may be modified.

Note that various portions of the above may be implemented by a software tool or program. For example, the analysis in 304, generation of the function in 306, reception of the user input in 308, and generation of code in 310 may be performed by the software tool. Additionally, the user input may be received via a graphical user interface (GUI) of the software tool.

In some embodiments, as indicated above, the method described above may be applied to a plurality of graphical programs. For example, where the plurality of graphical programs are included in a hierarchy of graphical programs (e.g., where there are a plurality of sub-graphical programs in a graphical program), the user may select one or more graphical programs for performing the method above. Thus, the analysis, generation of the function, modification, and code generation may be performed for one or more selected graphical programs.

FIGS. 4A-9C—Exemplary Illustrations Corresponding to the Method of FIG. 3

FIGS. 4A-9C are exemplary illustrations corresponding to the Method of FIG. 3.

Figure 4A:
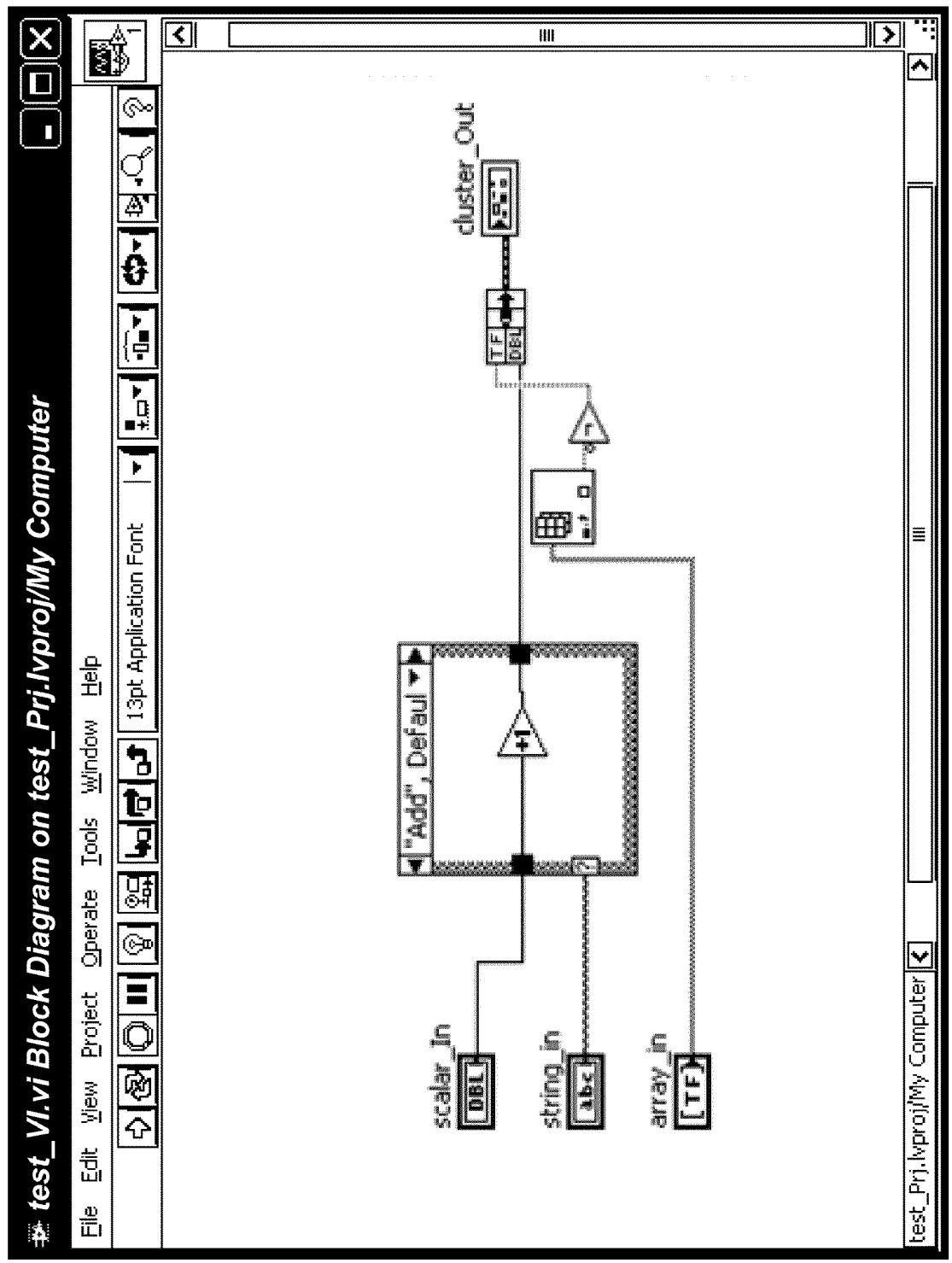
FIGS. 4-9C are exemplary illustrations corresponding to the method of FIG. 3.
Figure 4B:
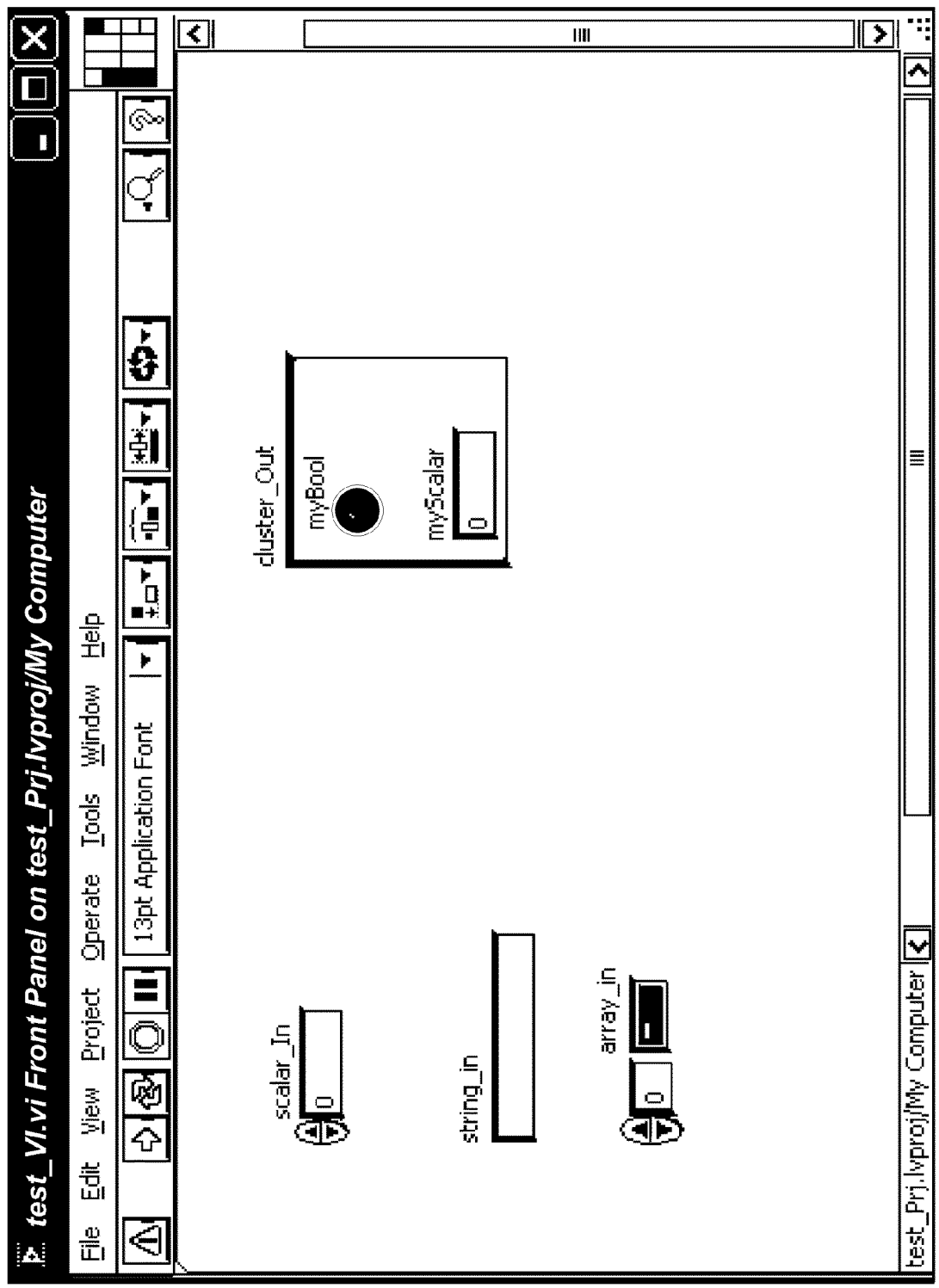

FIGS. 4A and 4B illustrate an exemplary block diagram (4A) and user interface portion (4B) of a graphical program. In the block diagram of 4A, three different inputs (scalar_in, string_in, and array_in) are connected via function blocks to generate an output, cluster_out, which includes a Boolean and a scalar. More particularly, where the string_in has a value of "add" the scalar_in is incremented and passed to the combiner, generating cluster_out. Where the string_in has a value of "subtract" (not shown), the scalar_in is decremented and passed to the combiner, generating cluster_out. The array_in is an array of Boolean values. In the block diagram of FIG. 4A, the first Boolean in array_in is extracted, inverted, and passed to the combiner to generate cluster_out.

FIG. 4B illustrates the corresponding user interface of the graphical program where the user may specify the values of scalar_in, string_in, and array_in and also view the generated output of cluster_out. Thus, FIGS. 4A and 4B illustrate a simple graphical program which may be used according to the method of FIG. 3 above.

Figure 5:
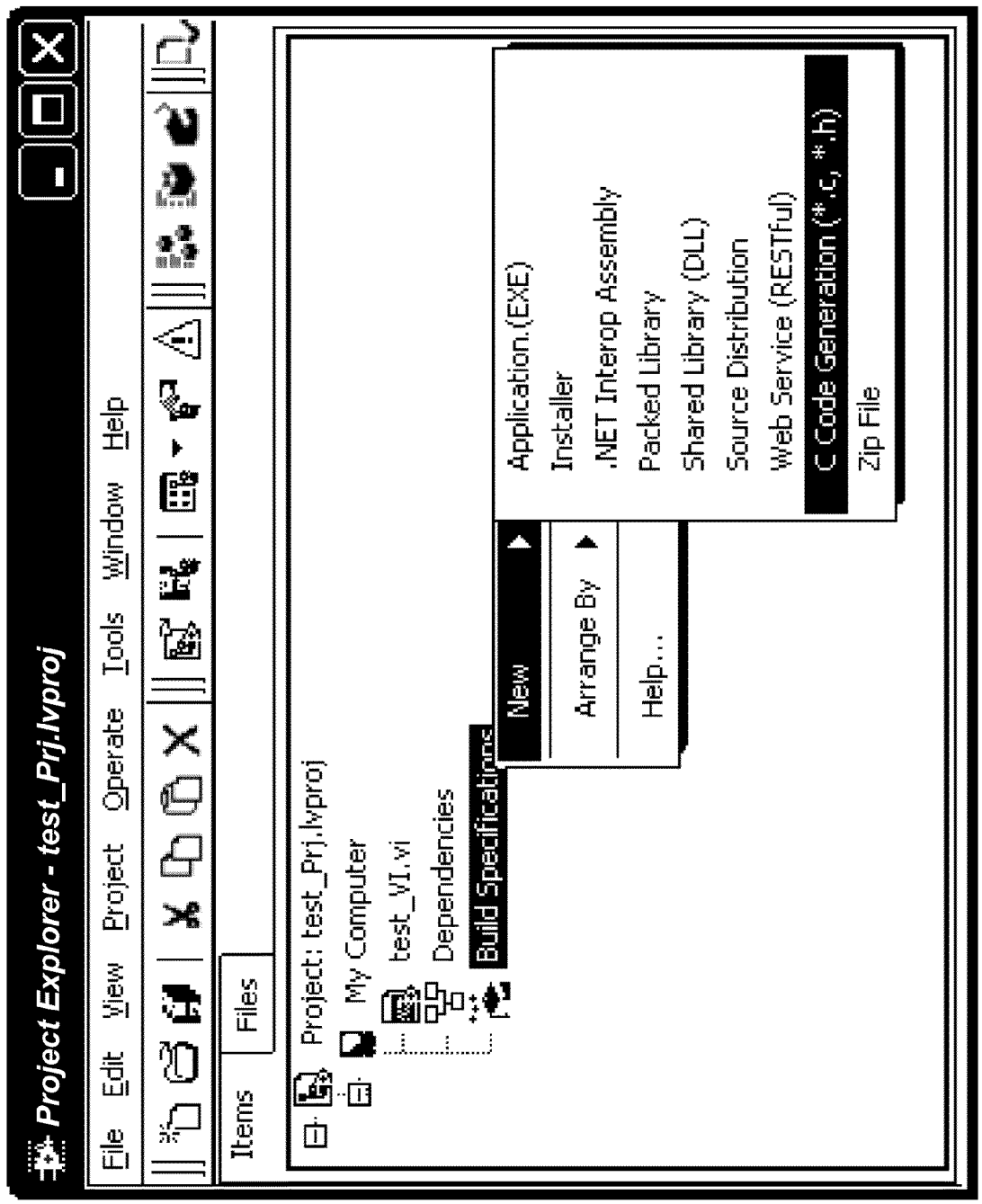

FIG. 5 illustrates an exemplary GUI where the user may use a project explorer to specify "C Code Generation" (among other available options) for a graphical program.

Figure 6:
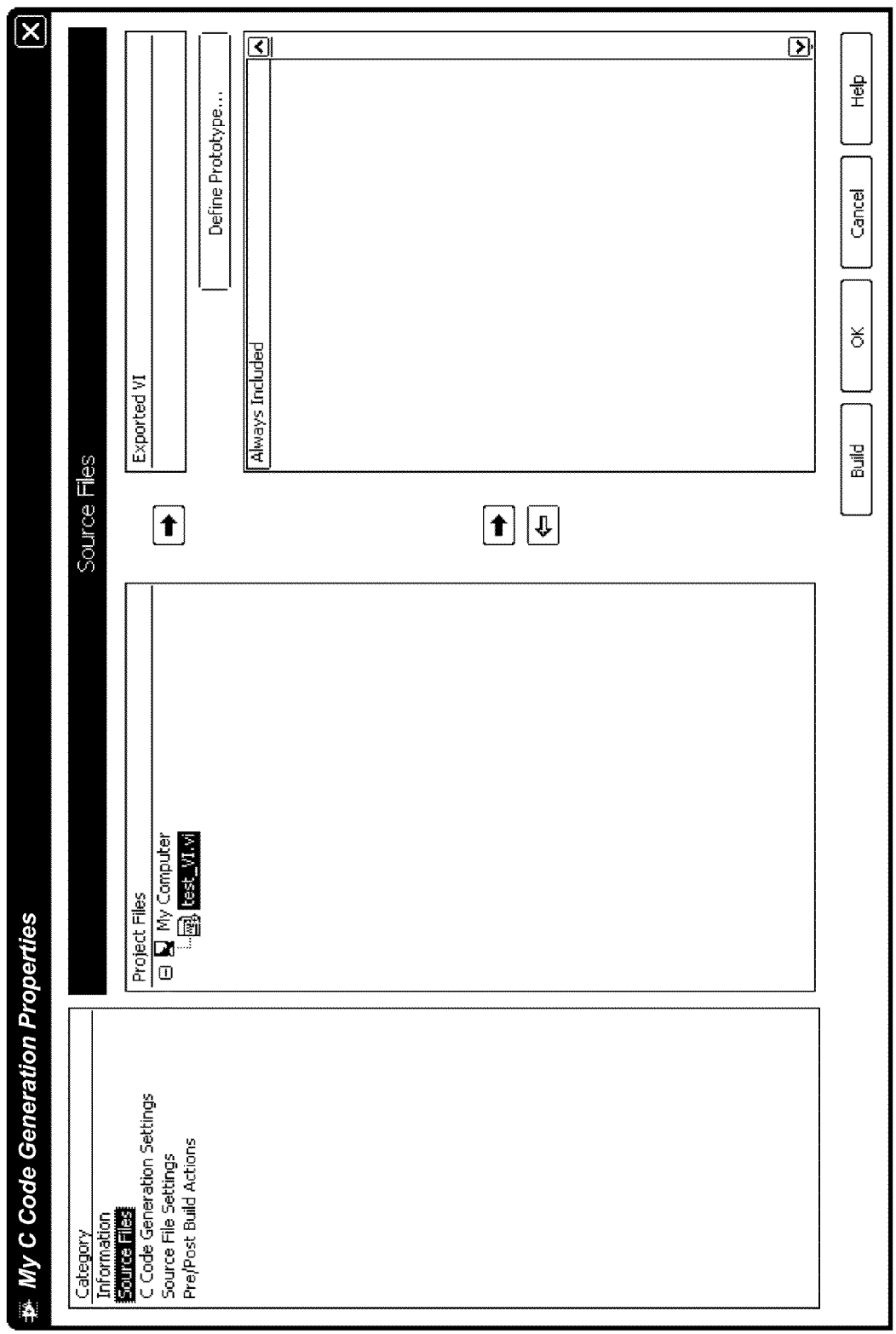

Upon selection of this option, the user may utilize the GUI of FIG. 6 to specify a particular graphical program (in this case, "test_VI.vi") for generating textual code. More particularly, as shown, the user may browse through a computer (or computer network) to locate a graphical program and then build and/or define a prototype for that graphical program.

Figure 7A:
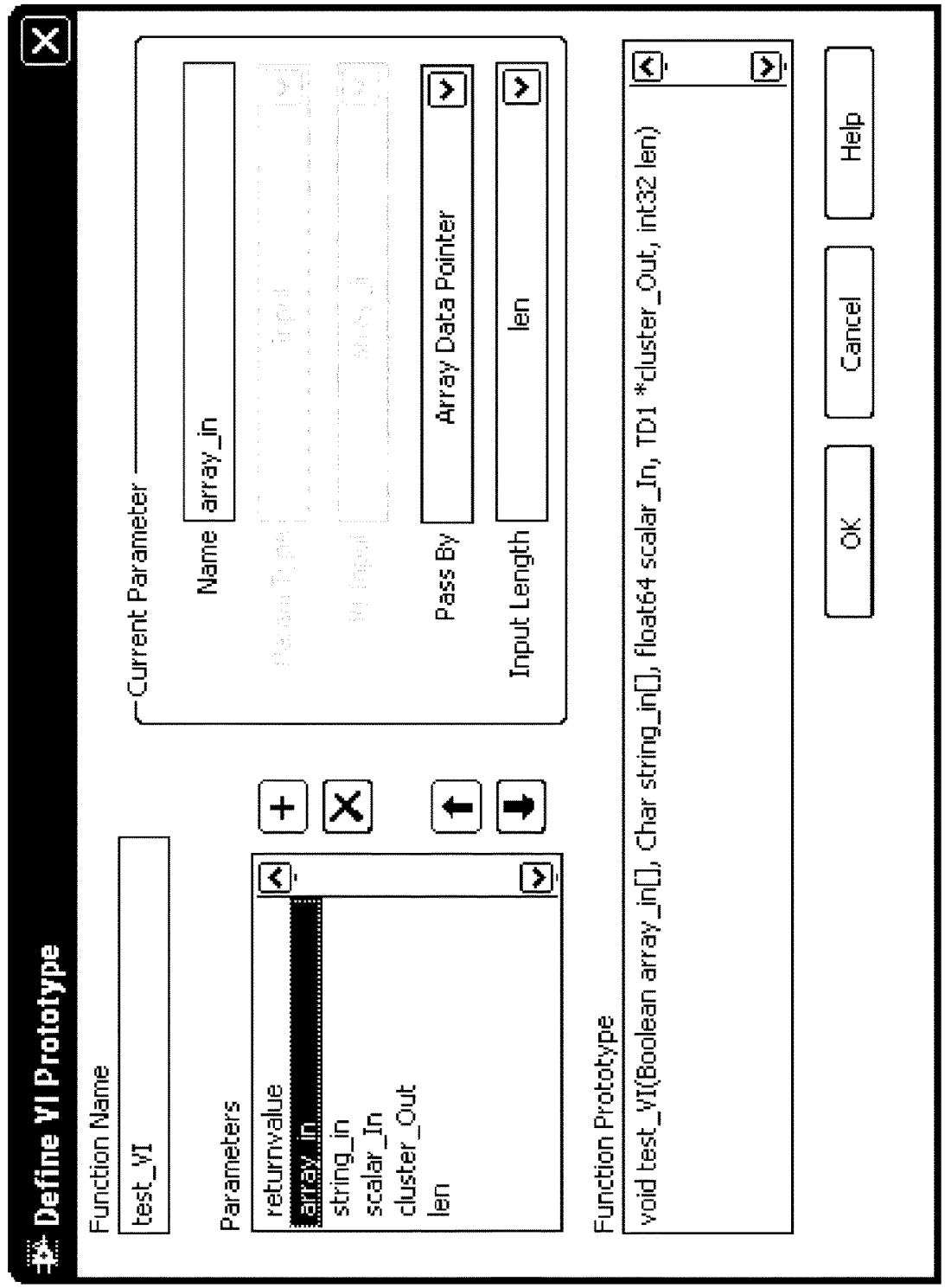

Once the user has selected the graphical program (although the user could have selected more than one graphical program), the GUI of FIG. 7A may be presented to the user. In this particular instance, the user has not changed any of the parameters or order from the graphical program's I/O interface. Thus, in this instance, the function prototype remains "void test_VI(Boolean array_in[ ], Char string_in[ ], float64 scalar_in, TD1 *cluster_out, int32 len" based on the I/O interface of the graphical program.

Figure 7B:
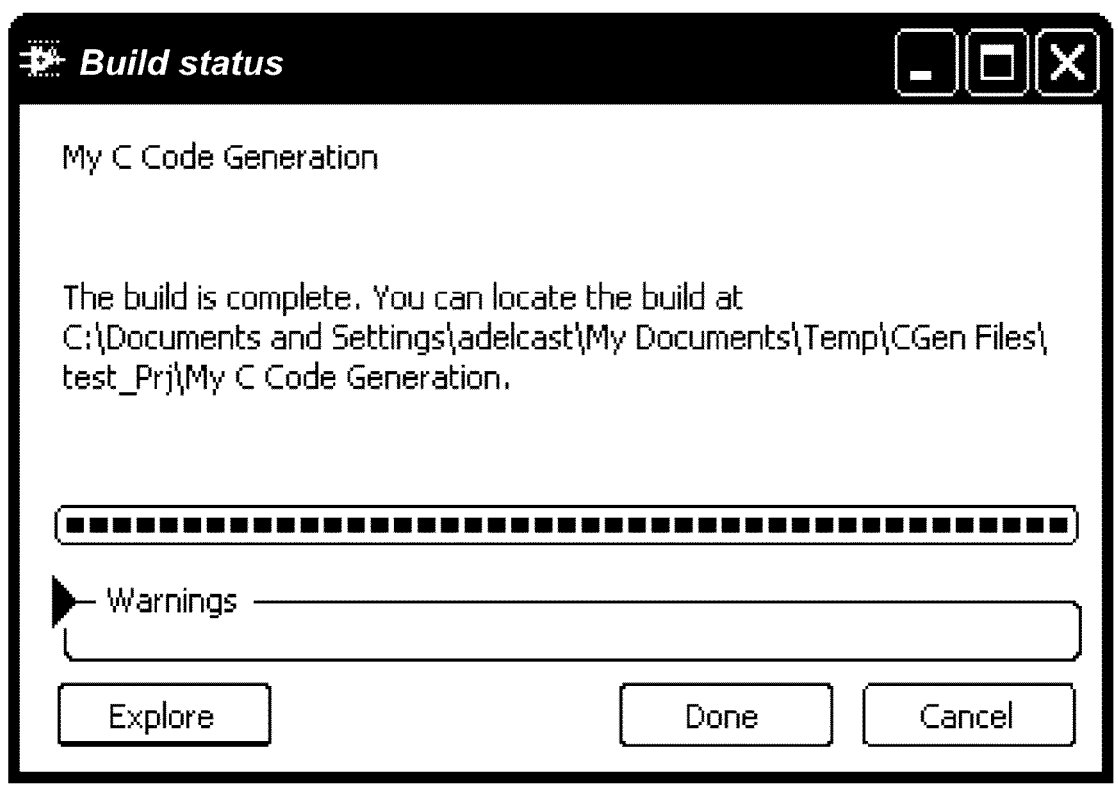

In FIG. 7B, once the user accepts the default values of FIG. 7A and initiates the build, a build status GUI is shown. As shown in FIG. 7B, the build has just finished.

FIG. 7C illustrates an exemplary header file generated based on the user input received in FIG. 7A. As shown in this Figure, the structure of the cluster is defined (Boolean myBool and float64 myScalar). Additionally, the wrapper's arguments have been defined according to the prototype shown in FIG. 7A and described above.

FIG. 7D illustrates the code for the corresponding wrapper, including the function. As shown, the function "test_VI" is defined using the default I/O interface specified by the user in FIG. 7A. Within the wrapper, various variables are defined, including temporary variable I, global variables, VI constants, etc. Further, the original I/O interface is utilized within the wrapper function by defining various variables (test_VI_in__2_array_in__223416656, test_VI_in__1_string_in__223469920, etc.) and then calling the function ("test_VI_Run( );"), which utilizes those variables similar to passed arguments. In further embodiments, the function call may simply include the variables as passed arguments. The wrapper then includes various cleanup routines (e.g., for constants and variables). Thus, FIGS. 7A-7D illustrates the textual code for the case where the user does not modify the I/O interface of the graphical program.

Figure 8A:
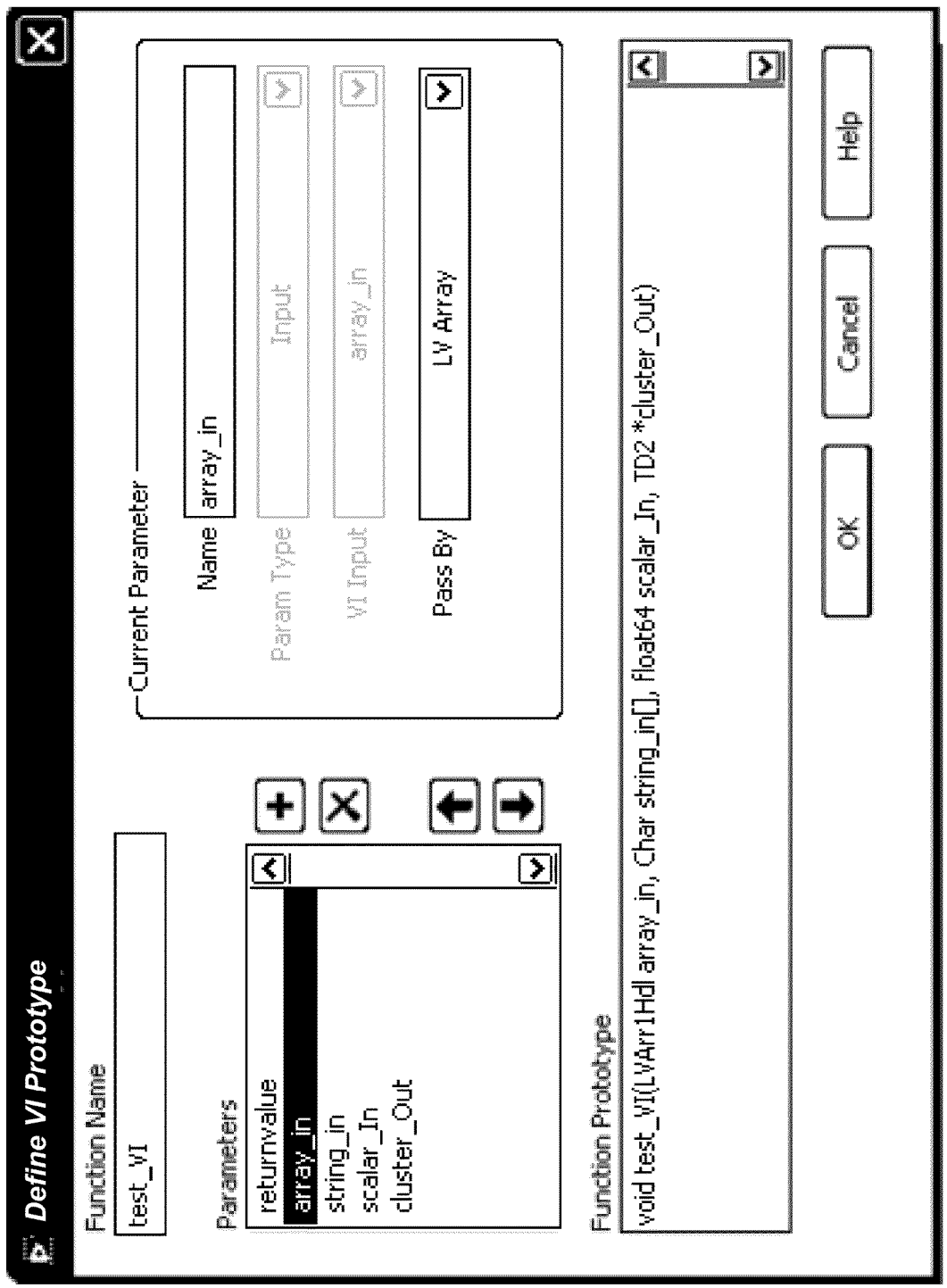

In FIG. 8A, the user has changed the array_in pass by to "LV Array" instead of "Array Data Pointer", thereby removing the necessity of the parameter "len". Accordingly, in FIG. 8A, the function prototype is "void test_VI(LVArr1Hdl array_in, Char string_in[ ], float64 scalar_in, TD2 *cluster_out)".

FIG. 8B illustrates the resulting header file which defines LVArr1Hdl and the cluster TD2, as well as the wrapper.

FIG. 8C illustrates the code for the corresponding wrapper, including the function. As shown, the same test_VI variables are still defined, except using the modified I/O interface specified by the user. For example, test_VI_in__2_array_in is defined according to the passed LVArr1HDL. Further, len is no longer used in this example.

Figure 9A:
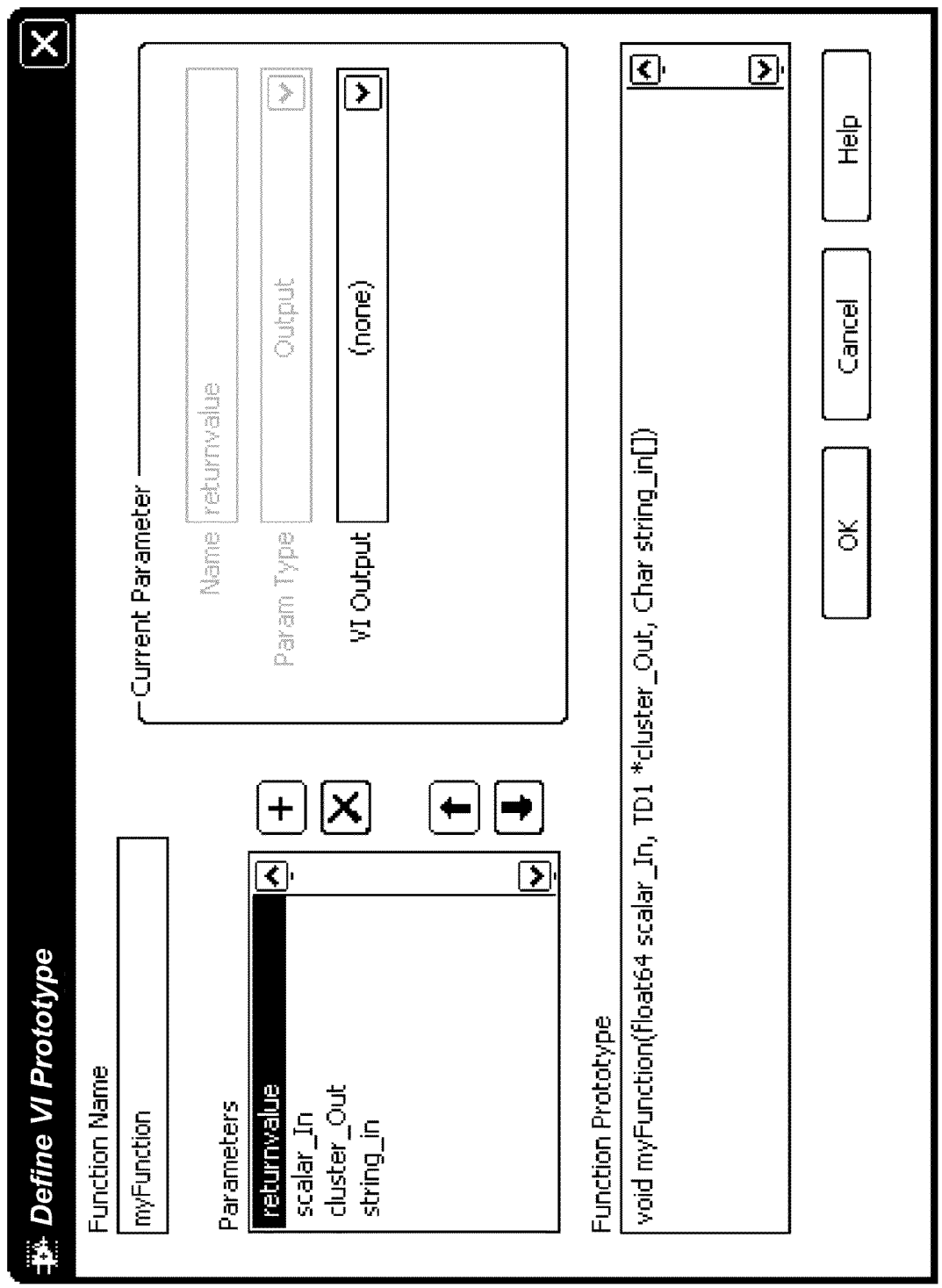

FIG. 9A, the user has removed the arr_in parameter, moved string_in parameter down in the order, and changed the function name to "myFunction". Correspondingly, the function prototype (or modified I/O interface) is "void myFunction (float64 scalar_in, TD1 *cluster_out, Char string_in[ ]).

FIG. 9B illustrates the resulting header file which defines the TD1 cluster and the wrapper.

FIG. 9C illustrates the code for the corresponding wrapper, including the function. As shown, the wrapper no longer receives array_in and string_in has been moved to the end. In this particular code, since the array_in is not received, a default value may be used, which may be defined as a global variable (as is the case for FIG. 9C) or may be defined within the wrapper, among other possibilities.

Thus, FIGS. 4A-9C illustrate various different I/O interfaces according to the method of FIG. 3.

Further Details

The methods described above may utilize any of various data types including string, 1D array, multi-D arrays, clusters, timestamps, fixed point, scalars, variants, waveforms, etc. Strings may be implemented in various languages, for example, in C, strings may be defined according to char*. Strings may be generated from graphical programs as PDAStr. Strings between C and graphical programs may utilize PDAStrNewFromBuf or PDAStrCStrFromLVStr. 1D arrays may be implemented via double[ ] or int16[ ] in C or PDAArrPtr from graphical programs. They may be interconverted via PDAArrNewFromCArray or PDAArrCArrayFromLVArray. Multi-D arrays may be implemented via double* or structures in C or PDAArrPtr from graphical programs. Clusters, timestamps, and waveforms may be defined via structs (structures). Fixed point may be implemented via uInt8, uInt16, uInt32, int8, int16, int32, etc. in C and uFixedPoint8, uFixedPoint16, uFixedPoint32, sFixedPoint8, sFixedPoint16, sFixedPoint32, etc. from graphical programs. Scalars may be implemented via unsigned char, signed char, signed long, unsigned long, signed short, unsigned short, double, single, etc. in C and int8, u8, int32, uInt32, int16, uInt16, float64, float32, etc. from graphical programs.

Each exported function declared in the header file may implement the conversion from the textual programming types (e.g., C types) to the internal CGen representation (PDAArr, PDAStr, etc) of the function, generated from the graphical program. The wrapper code may call into several new runtime functions used to convert to/from C types/CGen types. Then, as described above, each wrapper may call the function normally generated by the CCodeGenerator (VI-Name_Start( . . . )).

Arrays may be passed in different manners, e.g., as C Arrays and LV Arrays. C Arrays may be as simple as possible and may make a copy of all the data on the wrapper. LVArrays may have the same structure as internal PDAArray structures of the graphical program, with all the internal fields set as reserved. The wrapper may fill the reserved fills on the PDAArrays (datatype, refcnt, staticArray, fill) and pass the array directly to the internal function.

C Arrays: 1-D Arrays.—1 D Arrays may need to be defined by two parameters: pointer to data elements and length. The 1 D Array may be converted to internal PDAArr type inside the wrapper function. The runtime functions to convert 1D arrays to/from C types may include:

VoidHand PDAArrNewFromCArray(void* buf, DataType dt, int32 dimlen)
VoidHand PDAArr1DimCArrayFromLVArray(VoidHand vhIn, DataType dt)

C Arrays: Multidimensional Arrays.—Multidimensional arrays may be defined by a wrapping struct that contains a pointer to the element data as well as each dimension side. The runtime functions to convert from/to C types may include:

VoidHand PDAArrMultiDimNewFromCArray(void* buf, int32 dimLen[ ], DataType dt)
VoidHand PDAArrMultiDimCArrayFromLVArray(VoidHand vhIn, DataType dt)

The following is an exemplary C array data structure:

```
typedef struct {
    int32 dimSizes[2];
    float64 *elemArr;      // 2 D Array of doubles
} TD1;
```

Strings.—Received C Strings may be be copied into a PDAStr on the function wrapper. The runtime functions that perform the conversion may include:
VoidHand PDAStrNewFromBuf(TextPtr pBuf, uInt32 bufLen)
TextPtr PDAStrCStrFromLVStr(VoidHand vhIn)

Clusters.—The header file(s) may define structs that correspond to the cluster input/output. The wrapper may generate a copy of the cluster and pass it to the main function. Small clusters may be directly copied into their corresponding structure in the C file. For example:
SClusterIn__245776096=(cl_B0000*)SClusterIn;

where cl_B0000 is the internal struct type of the array and sClusterIn is the external input of type TD1 (defined in the header file and binary compatible tocl_B0000).

Big clusters need to be filled element by element from the input structure since they cannot be binary compatible. Example:

```
{
    cl_A0000* cl_010 = NULL;
    cl_010 = PDAClusterNewEmpty(0xA0000 | BigClusterDataType);
    cl_010->el_0 = BClusterIn->DBL;
    cl_010->el_1 = BClusterIn->DBL2;
    cl_010->el_2 = BClusterIn->DBL3;
    cl_010->el_3 = BClusterIn->I32;
    *(cl_A0000**)BClusterIn__245813216 = cl_010;
}
``` where BClusterin is the external input and BClusterIn__245813216 is the internal one, of type cl_A0000**.

Scalars—The wrapper may copy the value into a new variable and pass it into the main function (by value).

Fixed Point—Fixed point types may be mapped to scalars. The only difference is that the wrapper needs to document (comments) the fixed point structure (signed/unsigned, Word Length, Integer Word Length). For example,

```
sFixedPoint16 sFXPoint16,
// Input FXP Signed, Word Length 15, Integer Word Length: 12
```

Timestamps/Waveforms—To have users use timestamps, a struct with the internal CGen representation of timestamps (Timestamp128) may be exposed. Users may need to convert from a C time library to Timestamp128 to be able to interact with the component. Also, Timestamp128 may not be a graphical programming type, which may make the input/output incompatible if called from a graphical program. Since Waveforms use Timestamps, they may have the same issue. Example:

```
typedef struct {
    uInt32 secHi;
    uInt32 secLow;
    uInt32 fracHi;
    uInt32 fracLow;
} Timestamp128;
```

LVArrays—The LVArray (or graphical program array) option may create a wrapper structure that is binary compatible with PDAArray. The first 4 fields may be declared as reserved since users do not need to fill them. The wrapper function may be in charge of filling these fields with the appropriate values, reusing the structure and avoiding a copy. The numDims field may not need to be filled, as it may be used for the output case (to be able to determine how big the dimSizes array is). Exemplary wrapper structure:

```
typedef struct {
    uInt32 res1;              // datatype
    int16 res2;               // refcnt
    uInt8 res3;               // staticArray
    uInt8 res4;               // fill
    uInt32 numDims;           // number of dimensions
    ArrDimSize dimSizes[2];
    float64 elemArr[1];
} LVArr1, *LVArr1Hdl;
```

Example wrapper code (input case):
Double__232805160=*Double;
((PDAArrPtr)Double__232805160)->refcnt=1;
((PDAArrPtr)Double__232805160)->staticArray=1;
((PDAArrPtr)Double__232805160)->GlobalVariable=0;
((PDAArrPtr)Double__232805160)->datatype=double DataType;
NDims((PDAArrPtr)Double__232805160)=2;

The staticArray field of the external LVArray may be set to True. Setting this field to True may prevent the runtime from trying to resize or free the array. If the array needs to be resized, a new copy may be created. The array may never be freed.

In the output case, the handle passed to the wrapper function may be filled with a LVArr struct that the user can use based on the definition on the header file.

Input/Output Param Type—With LVArrays, the output may be returned in the same handle as the input. The GUI may need to provide a way to map inputs to outputs. Array Input/Output parameters may be passed as Handles (double pointers) since a resize may result in a new pointer to the new array. Scalars Input/Output parameters (pass by reference) may also be supported.

Figure 10:
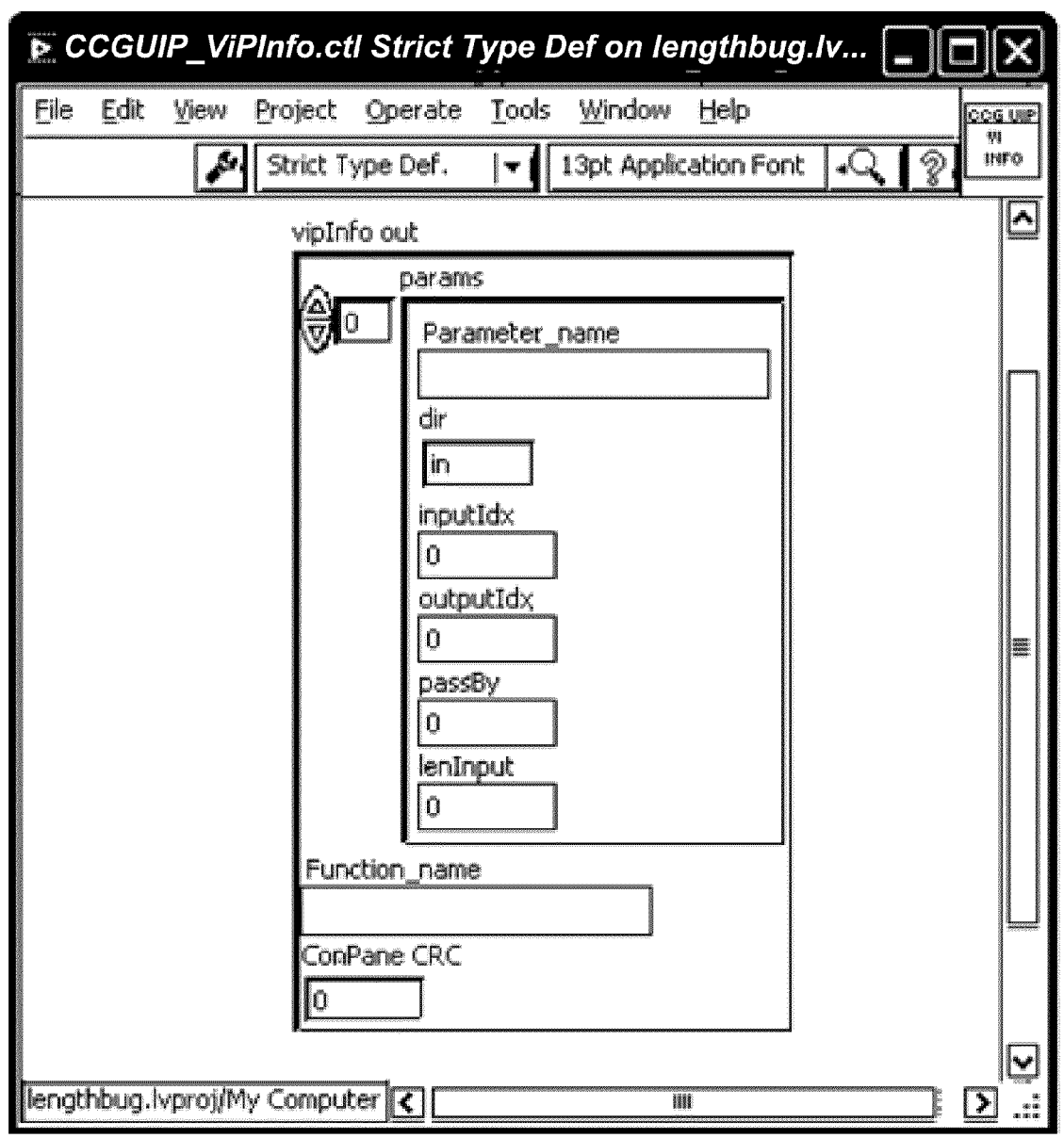
FIG. 10 is an exemplary graphical representation of an internal structure that may be used for generating textual code from graphical programs.

FIG. 10 illustrates an exemplary data structure which may be used internally to represent the I/O interface or prototype for creating the wrapper and/or function. The "Configure Prototype" dialog on the build provider should output an array of VI Proto Info type. The DLL Builder may define this control and may contain all the information needed to reconstruct the prototype defined on the GUI. In this embodiment, the VIServerGenerateCCodeVariant function may have a Variant as its only parameter. The array of VI Proto Info type may be passed as an attribute to the Variant parameter. This information may be used to generate the declaration and definition of the exported functions, such as those described above.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A non-transitory computer-accessible memory medium that stores program instructions executable by a computer system to perform:
    analyzing a graphical program, wherein the graphical program comprises a plurality of interconnected nodes that visually indicate functionality of the graphical program, and wherein the graphical program comprises an I/O interface comprising one or more ordered parameters for providing input to or receiving output from the graphical program;
    generating a function in a textual programming language based on said analyzing the graphical program, wherein the function implements the functionality of the graphical program, and wherein the function comprises a textual function I/O interface with the one or more ordered parameters of the I/O interface of the graphical program;
    displaying the textual function I/O interface;
    receiving user input specifying one or more changes to the textual function I/O interface to produce a modified textual function I/O interface; and
    in response to the user input, automatically generating a wrapper for the function in the textual programming language with the modified textual function I/O interface, wherein the wrapper is configured to invoke the function, and wherein during execution the wrapper receives one or more input values in accordance with the modified textual function I/O interface and provides the one or more input values to the function via the textual function I/O interface.

2. The non-transitory computer-accessible memory medium of claim 1, wherein the wrapper is configured to:
    receive the one or more input values in a first order in accordance with the modified textual function I/O interface; and
    invoke the function by passing the one or more input values to the function in a second order in accordance with the textual function I/O interface, wherein the second order is different than the first order.

3. The non-transitory computer-accessible memory medium of claim 1, wherein said receiving user input specifying one or more changes to the textual function I/O interface comprises one or more of:
    receiving user input changing a number of parameters in the textual function I/O interface;
    receiving user input changing data types of one or more parameters in the textual function I/O interface;
    receiving user input changing names of one or more parameters in the textual function I/O interface;
    receiving user input changing an order of parameters in the textual function I/O interface; or
    receiving user input changing a parameter passing mechanism of the textual function I/O interface.

4. The non-transitory computer-accessible memory medium of claim 1, wherein the program instructions implement a software tool, wherein said analyzing, said generating a function, said displaying, said receiving user input, and said modifying are performed by the software tool, and wherein said displaying and said receiving user input are performed via a graphical user interface (GUI) of the software tool.

5. The non-transitory computer-accessible memory medium of claim 1, wherein the graphical program comprises a block diagram portion and a user interface portion, and wherein the I/O interface of the graphical program is implemented via the user interface portion.

6. The non-transitory computer-accessible memory medium of claim 5, wherein the user interface portion comprises a GUI with one or more controls or indicators corresponding to the one or more parameters of the I/O interface of the graphical program.

7. The non-transitory computer-accessible memory medium of claim 1, wherein the program instructions are further executable by the computer system to perform:
    compiling the wrapper, including the function, to generate a binary file.

8. The non-transitory computer-accessible memory medium of claim 1,
    wherein said generating the function in a textual programming language comprises generating a first function prototype in accordance with the I/O interface of the graphical program; and
    wherein said generating the wrapper for the function in the textual programming language with the modified textual function I/O interface comprises generating a second function prototype in accordance with the modified textual function I/O interface.

9. The non-transitory computer-accessible memory medium of claim 1,
    wherein the graphical program is written in a graphical programming language, wherein the graphical programming language comprises a first set of specified data types;
    wherein the textual programming language comprises a second set of specified data types that differs from the first set of specified data types; and
    wherein the wrapper is configured to convert between corresponding, but different, data types, included in the textual function I/O interface and the modified textual function I/O interface, respectively.

10. The non-transitory computer-accessible memory medium of claim 1, wherein the graphical program is a first graphical program comprised within a hierarchy of graphical programs, wherein the program instructions are further executable to perform:
    receiving user input selecting one or more graphical programs, including the first graphical program, from the hierarchy of graphical programs;
    wherein said analyzing, said generating a function, said receiving user input, and said generating a wrapper are performed in response to said receiving user input selecting one or more graphical programs, wherein the program instructions are further executing to perform:
    performing said analyzing, said generating a function, said receiving user input, and said generating a wrapper for any graphical programs selected by the user input in addition to the first graphical program.

11. A computer-implemented method, comprising:
    utilizing a computer to perform:
    analyzing a graphical program, wherein the graphical program comprises a plurality of interconnected nodes that visually indicate functionality of the graphical program, and wherein the graphical program comprises an I/O interface comprising one or more ordered parameters for providing input to or receiving output from the graphical program;
    automatically generating a function in a textual programming language based on said analyzing the graphical program, wherein the function implements the functionality of the graphical program, and wherein the function comprises a textual function I/O interface with the one or more ordered parameters of the I/O interface of the graphical program;

displaying the textual function I/O interface;

receiving user input specifying one or more changes to the textual function I/O interface to produce a modified textual function I/O interface; and in response to the user input, automatically generating a wrapper for the function in the textual programming language with the modified textual function I/O interface, wherein the wrapper is configured to invoke the function, and wherein during execution the wrapper receives one or more input values in accordance with the modified textual function I/O interface and provides the one or more input values to the function via the textual function I/O interface.

12. The computer-implemented method of claim 11, further comprising:

including the wrapper in a program; and executing the program, including:

receiving, to the wrapper, the one or more input values in a first order in accordance with the modified textual function I/O interface; and the wrapper invoking the function by passing the one or more input values to the function in a second order in accordance with the textual function I/O interface, wherein the second order is different than the first order.

13. The computer-implemented method of claim 11, wherein said receiving user input specifying one or more changes to the textual function I/O interface comprises one or more of:

receiving user input changing a number of parameters in the textual function I/O interface;

receiving user input changing data types of one or more parameters in the textual function I/O interface;

receiving user input changing names of one or more parameters in the textual function I/O interface;

receiving user input changing an order of parameters in the textual function I/O interface; or receiving user input changing a parameter passing mechanism of the textual function I/O interface.

14. The computer-implemented method of claim 11, wherein said analyzing, said automatically generating a function, said displaying, said receiving user input, and said automatically generating a wrapper are performed by a software tool, and wherein said displaying and said receiving user input are performed via a graphical user interface (GUI) of the software tool.

15. The computer-implemented method of claim 11, wherein the graphical program comprises a block diagram portion and a user interface portion, and wherein the I/O interface of the graphical program is implemented via the user interface portion.

16. The computer-implemented method of claim 11, further comprising:

compiling the wrapper, including the function, to generate a binary file.

17. The computer-implemented method of claim 11, wherein said generating the function in a textual programming language comprises generating a first function prototype in accordance with the I/O interface of the graphical program; and wherein said generating the wrapper for the function in the textual programming language with the modified textual function I/O interface comprises generating a second function prototype in accordance with the modified textual function I/O interface.

18. The computer-implemented method of claim 11, wherein the graphical program is written in a graphical programming language, wherein the graphical programming language comprises a first set of specified data types;

wherein the textual programming language comprises a second set of specified data types that differs from the first set of specified data types; and wherein the wrapper is configured to convert between corresponding, but different, data types, included in the textual function I/O interface and the modified textual function I/O interface, respectively.

19. The computer-implemented method of claim 11, wherein the graphical program is a first graphical program comprised within a hierarchy of graphical programs, wherein the method further comprises:

receiving user input selecting one or more graphical programs, including the first graphical program, from the hierarchy of graphical programs;

wherein said analyzing, said generating a function, said receiving user input, and said generating a wrapper are performed in response to said receiving user input selecting one or more graphical programs, wherein the method further comprises:

performing said analyzing, said generating a function, said receiving user input, and said generating a wrapper for any graphical programs selected by the user input in addition to the first graphical program.

20. A system comprising:

one or more processors; and memory storing program instructions, wherein the program instructions are executable by the one or more processors to implement operations including:

analyzing a graphical program, wherein the graphical program comprises a plurality of interconnected nodes that visually indicate functionality of the graphical program, and wherein the graphical program comprises an I/O interface comprising one or more ordered parameters for providing input to or receiving output from the graphical program;

generating a function in a textual programming language based on said analyzing the graphical program, wherein the function implements the functionality of the graphical program, and wherein the function comprises a textual function I/O interface with the one or more ordered parameters of the I/O interface of the graphical program;

displaying the textual function I/O interface;

receiving user input specifying one or more changes to the textual function I/O interface to produce a modified textual function I/O interface; and in response to the user input, generating a wrapper for the function in the textual programming language with the modified textual function I/O interface, wherein the wrapper is configured to invoke the function, and wherein during execution the wrapper receives one or more input values in accordance with the modified textual function I/O interface and provides the one or more input values to the function via the textual function I/O interface.

* * * * *